United States Patent [19]

Shinjo

[11] Patent Number: 5,509,334
[45] Date of Patent: Apr. 23, 1996

[54] DRIVER BIT FOR A RECESSED SCREW

[75] Inventor: Katsumi Shinjo, Osaka, Japan

[73] Assignee: Yugenkaisha Shinjo Seisakusho, Osaka, Japan

[21] Appl. No.: 396,438

[22] Filed: Feb. 28, 1995

Related U.S. Application Data

[62] Division of Ser. No. 149,624, Nov. 9, 1993.

[30] Foreign Application Priority Data

Nov. 17, 1992 [JP] Japan ..................... 4-332544

[51] Int. Cl.⁶ .................. B25B 15/00; B25B 23/00
[52] U.S. Cl. ................................. 81/460; 81/436
[58] Field of Search .................. 81/460, 436, 186

[56] References Cited

U.S. PATENT DOCUMENTS 2,777,353  10/1952  Willis .
3,584,667   6/1971  Reiland ........................ 81/460
4,269,246   5/1981  Larson et al. ................. 81/460
4,646,594   3/1987  Tien .
5,219,253   6/1993  Shinjo .
5,435,680   7/1995  Schuster ....................... 81/460

FOREIGN PATENT DOCUMENTS 0164318  5/1985  European Pat. Off. .

Primary Examiner—Bruce M. Kisliuk
Assistant Examiner—Joni B. Danganan
Attorney, Agent, or Firm—Antonelli, Terry, Stout & Kraus

[57] ABSTRACT

A driver bit adapted to engage in a recess of a recessed screw which recess is defined as a coaxial superimposition of two equilaterally triangular and cylindrical recesses each having arcuate vertices and arranged with a phase shift of 60° about a center axis of the recessed screw to provide six engagable grooves and six driven vanes. The driver bit includes six driving vanes and six valleys, with each driving vane being shaped in conformity with each groove in the recess of the recessed screw, and with each valley being interposed between adjacent driving vanes and shaped in conformity with each driven vane in the recess of the recessed screw.

3 Claims, 4 Drawing Sheets

DRIVER BIT FOR A RECESSED SCREW

This is a divisional of application Ser. No. 08/149,624 filed on Nov. 9, 1993.

BACKGROUND OF THE INVENTION

1. Field of the Invention

The present invention pertains a recessed screw having a recess formed in the head thereof to receive a driver bit, more particularly relates to an improved shape of the recess, and further relates to a driver bit for use with and engageable with the recessed screw having the improved recess.

2. Description of Prior Art

One of the prior art recessed screws which is called a "Torx" ( a registered trademark, see Japanese Utility Model Publication No. Sho. 48-39959) does comprise a screw head 1 in which a recess 2 engageable with a driver bit is formed as shown in FIGS. 6 and 7. This recess is defined by semicylindrical concaves 3 and semicylindrical convexes 4 which alternate one with another, and each convex continues smoothly to the adjacent concaves. The concaves 3 recede radially outwardly, and the convexes 4 protrude radially inwardly so that they provide six grooves 5 and six thick vanes 6 to be driven. The side driven walls of each vane extend straight in parallel with the axis of the screw. Because of this feature, the Torx screws are advantageous in that there arises no problem of "ride-out" of the driver bit when it is driven, thus permitting a high torque to be applied to the recessed screw.

Contrary to usual screws each having a crossed recess, the Torx screws which lack the "biting" action for driver bits are disadvantageous in the automatic fastening of the screws. The clearance between the recess of Torx screw and the driver bit is so large that the bit is likely to slip off the recess. This is a serious problem in particular when a self-drilling screw or an elongated self-tapping screw is fastened at high rotational speeds by a vibrating bit.

In general, the self-drilling and self-tapping screws are hardened before delivery to users. Thus, the driven vanes in their recesses are rendered harder and of a significantly higher mechanical strength as compared with nonhardened screws. On the other hand, the driver bit has driving vanes designed for engagement with the grooves 5 in the recess 2 of Torx screws. The cross-sectional area of the driving vane is therefore designed to match such an area "a" of groove 5, which however is much smaller than that "b" of each driven vane 6. Consequently, the driver bit will be worn soon if repeatedly used with the hardened screws of the self-drilling or self-tapping, types.

As noted above, the side wall of each driven vane 6 in the Torx screw recess 2 is composed of the semicylindrical concave 3 and convex 4 continuing one to another. Therefore, it is difficult for conventional instruments to accurately measure the dimensional precision of such curved walls. Since only a minute clearance is allowed between the recess 2 of a smaller screw and a driver bit fitting therein, it is not easy to ensure a satisfactory preciseness to those recess 2 and bit.

SUMMARY OF THE INVENTION

The present invention was made in view of the problems inherent in the prior art Torx screws, and an object of the present invention is therefore to provide a recessed screw having a recess which surely bites a driver bit fitted therein, offers a possibility of remarkably increasing the strength of driving vanes of the bit, and also another possibility of being used in combination with the prior art driver bit for Torx screws. The invention further provides a driver bit of a novel type designed for use with the recessed screw disclosed herein.

In order to achieve these objects, a recessed screw in accordance with the present invention has a head with a recess formed therein, characterized in that the recess is defined as a coaxial superimposition of two equilaterally-triangular and cylindrical bores which each have arcuate vertices and are arranged with a phase shift of 60° around an axis of the screw to thereby provide six engageable grooves and six driven vanes alternating one with another, wherein side walls of each driven vane extend in parallel with the axis, and inner ridges of the driven vane are chamfered each to form a conically curved sticking wall which is inwardly slanted towards a bottom of the recess. In this recessed screw, the cross-sectional area of each engageable groove is larger than that of each driven vane.

A driver bit which is provided herein and adapted for use to fasten the recessed screw as summarized above is characterized by six driving vanes for engagement with the engageable grooves of the recess formed in the screw, such that six valleys are formed each between the adjacent driving vanes so as to fit on the respective driven vanes of said recess.

When the screw is fastened by the driver bit fitted in the recess of the screw, bottoms of the valleys formed on said bit will tightly engage with the conically curved sticking walls in the recess on the screw whereby a biting action is produced for the driver bit. With a fastening torque being imparted to said bit in this state, the side surface of each driving vane will come into close contact with the side surface of each driven vane of the recessed screw so that the torque is transmitted from the format to the latter. No "ride-out" of bit will occur during this operation, because all the side surfaces of driving and driven vanes extend in parallel with the axis of screw. Since each groove in the recess on the screw is substantially larger in cross-sectional area than each driven vane, the cross-sectional area of each driving vane of the bit can be made equal to that of said groove in the recess on the screw. This feature is advantageous in that the mechanical strength of the driver bit is improved to a remarkable degree as compared with the prior art driver bit for Torx screws.

DETAILED DESCRIPTION OF THE PREFERRED EMBODIMENTS

Figure 1:
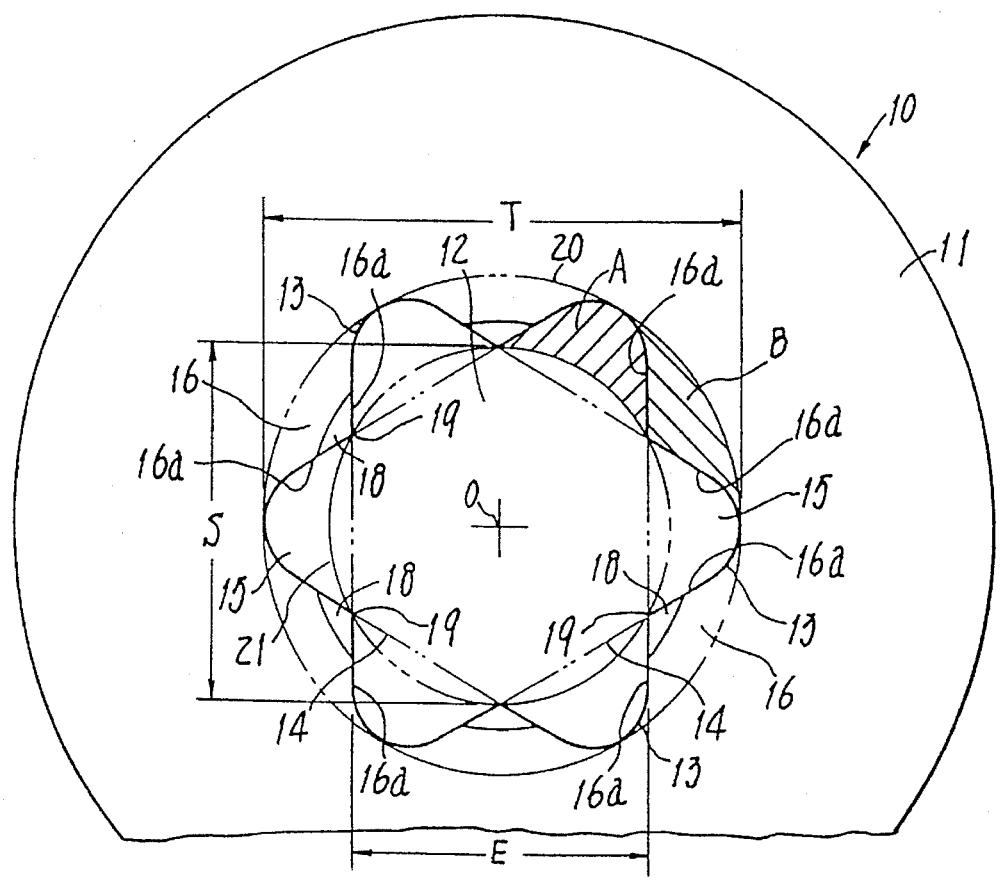
FIG. 1 is a plan view of a recessed screw provided in accordance with the present invention.
Figure 2:
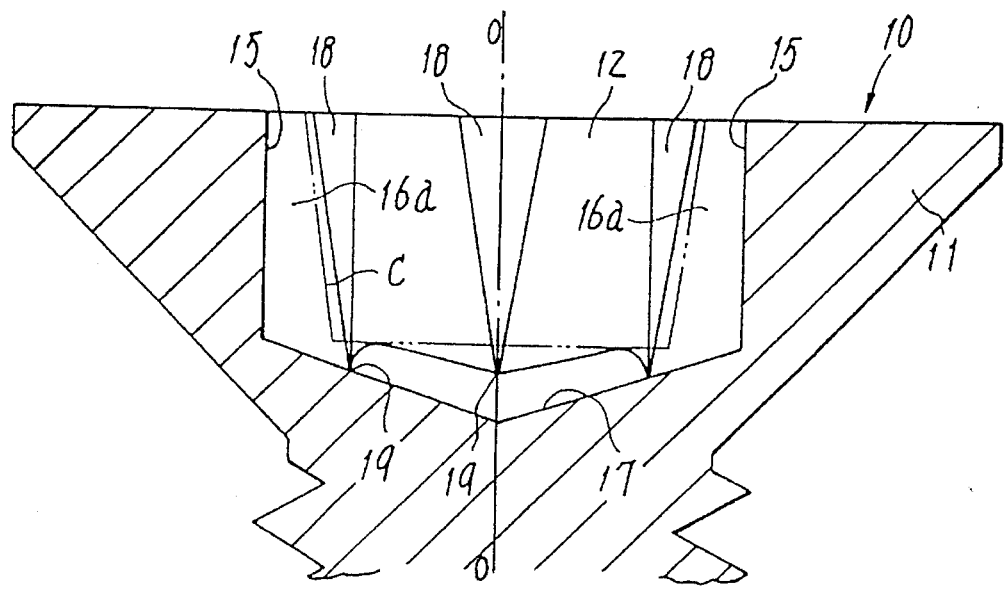
FIG. 2 is a vertical cross section in part of the recessed screw of FIG. 1.
Figure 3:
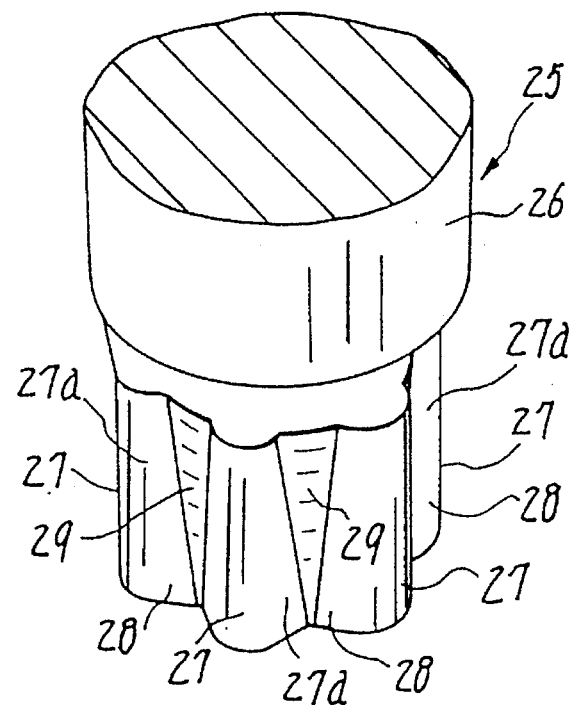
FIG. 3 is a perspective view showing in part a driver bit together with the recessed screw of FIG. 1.
Figure 3:
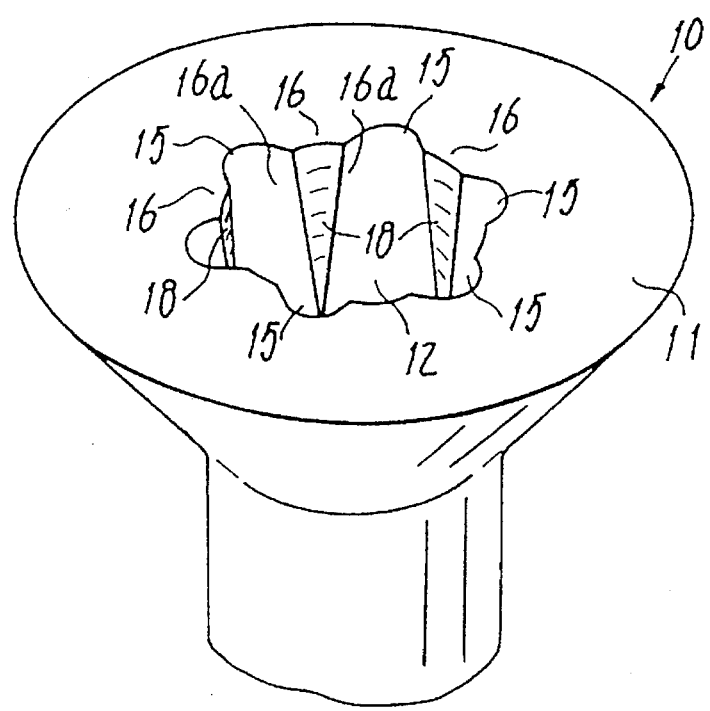

The embodiments of the present invention will now be described below referring to the drawings, in which FIGS. 1 and 2 show a recessed screw provided herein and FIG. 3 illustrates the screw in engagement with a driver bit.

A recessed screw 10 in this embodiment comprises a head 11 having a recess 12 formed therein for engagement therewith. The recess has in cross section a contour defined by superimposing two equilaterally-triangular bores 14 and 14 coaxial with one another. Each bore has vertices each shaped arcuate to give a partially cylindrical surface 13, and those bores are arranged symmetrically with a phase shift of 60° around an axis "O—O" of the screw so that six engageable grooves 15 and six driven vanes 16 are formed. These grooves and vanes alternate one with another, and side walls 16a of each driven vane 16 are flat planes each continuing to the adjacent partially cylindrical surface 13. The cylindrical surface is a bottom of each engageable groove 15, and the side walls 16a extend in parallel with the axis "O—O" and reach a bottom 17 of this recess 12. The side walls 16a intersect one another to provide an inner ridge of the driven vane 16. Each ridge is chamfered to provide a sticking wall 18 which is conically curved in cross section and inwardly slanted at a gentle angle (of or less than about 10°) towards the bottom 17 off the recess 12. In detail, the sticking walls 18 which are intended to bite an inserted driver bit 25 as described below are sections of a conical surface having its center aligned with the axis "O—O" and being inwardly slanted towards the bottom 17 of said recess. The transverse width of each sticking wall 18 gradually decreases from its upper end towards its lower end 19, which merges into an intersecting point of two side walls 16a, thus converging into the bottom 17.

Mechanical strength of each driven vane 16 depends on, and substantially is proportional to, a cross-sectional area "B" surrounded by a circumcircle 20 of recess 12, the side walls 16a and partially cylindrical surface 13. In the recessed screw provided herein, the cross-sectional area "B" is smaller than that "A" of each engageable groove 15. The latter cross-sectional area "A" is for a space which is defined and surrounded by an inscribed circle 21, the side walls 16a and partially cylindrical surface 13. The inscribed circle 21 includes every nodal line on which extrapolations of the adjacent side walls 16a intersect one another. This means that the driver bit 25 can have, for engagement with the grooves 15, driving vanes 27 each of a cross-sectional area larger than that "B" of each driven vane 16 in the recess 12. This feature makes it possible to strengthen the driver bit 25 to be more durable.

Figure 4:
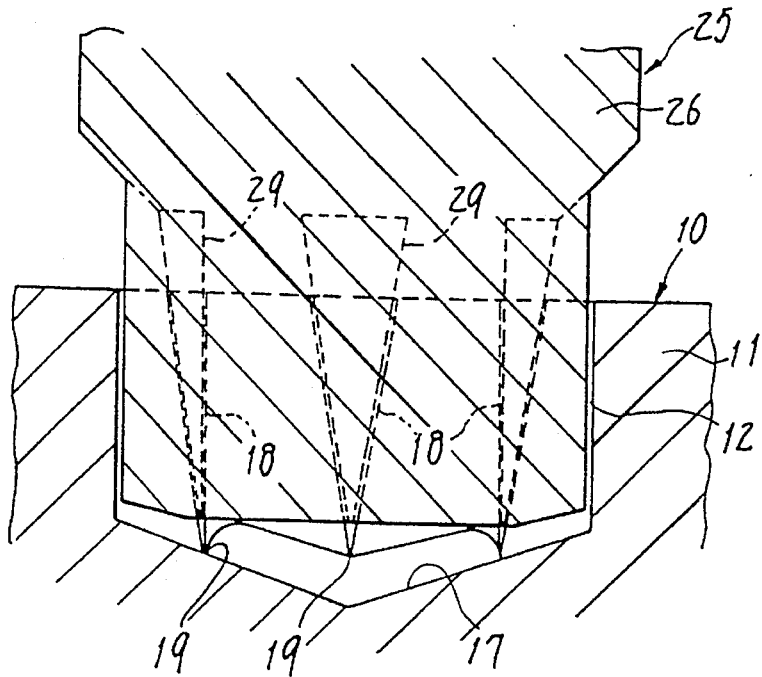
FIG. 4 is a vertical cross section of the driver bit in engagement with a recess in the screw of FIG. 1.

FIGS. 3 and 4 show the driver bit 25 which is engageable with the the recess 12 so as to fasten the described screw 10. The driver bit comprise six driving vanes 27 ridge-shaped and formed at an end of a shank 26, in conformity with the grooves 15 in the recess 12. The driver bit further comprises six valleys 28 each disposed between the adjacent driving vanes 27, also in conformity with the driven vanes 16 in said recess 12. A bottom of each valley 28 is a conically curved surface 29 which can closely fit on the conically curved sticking wall 18 present in the recess 12.

In use, the bit 25 will be inserted at first in the recess 12 of the screw 10 so that conically curved bottom surfaces 29 of the former come into close engagement with the conically curved sticking walls 18 of the latter, thus the biting action appearing between them. With a fastening torque being subsequently applied to the bit 25, one of side walls 27a of each driving vane 27 will contact the corresponding side wall 16a of each driven vane 16 in the recess 12 so as to transmit the torque through the latter wall 16a to the screw 10. Since the torque-transmitting walls 16a and 27a are formed parallel with the axis "O—O" of screw 10 and bit 25, respectively, the torque transmitted from the bit does not produce any axial component but imparts only a rotational moment to the screw. Thus, the driver bit 25 will not be caused to "ride out" of the recess while fastening the screw, but efficiently transmit the torque thereto. Even if the driver bit 25 is rotated at considerably high speeds, it will never slip off the recess 12.

Figure 5:
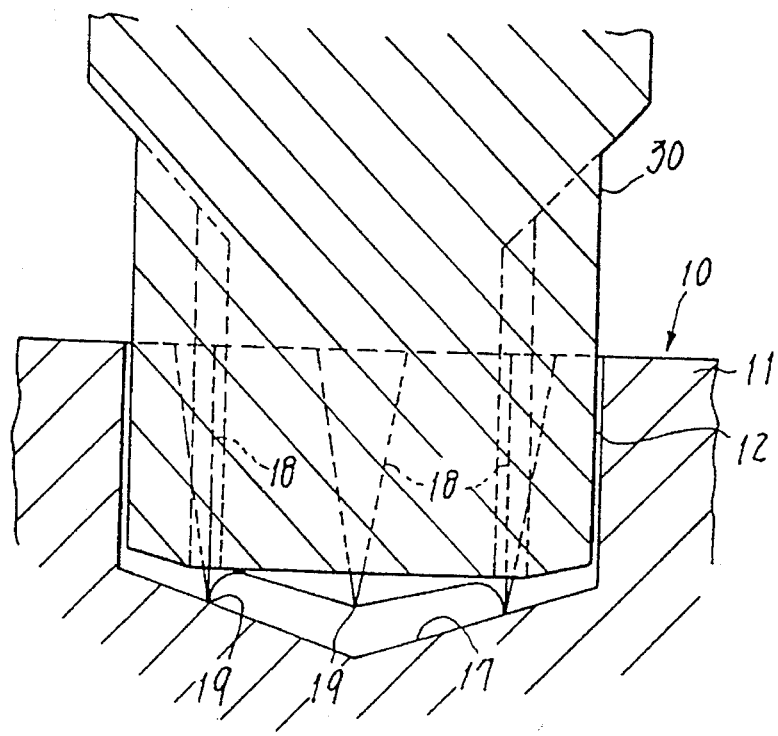
FIG. 5 also is a vertical cross section of a prior art driver bit in engagement with the recess in the screw of FIG. 1.
Figure 6:
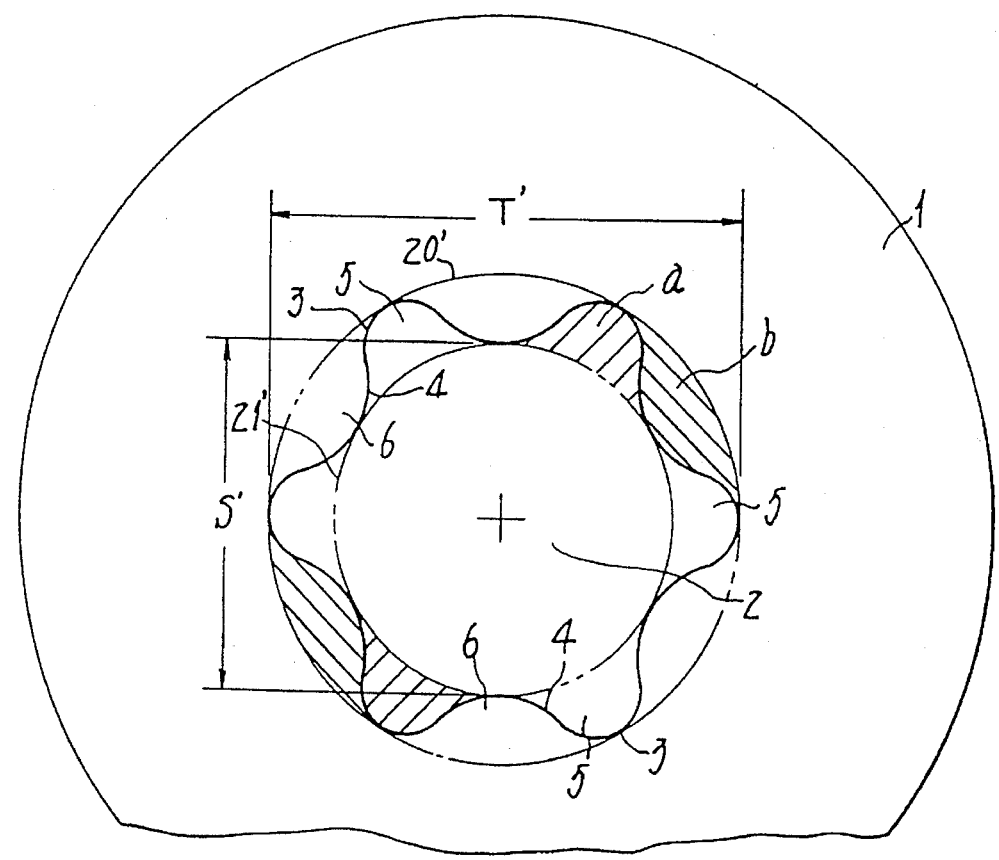
FIG. 6 is a plan view of a prior art recessed screw.
Figure 7:
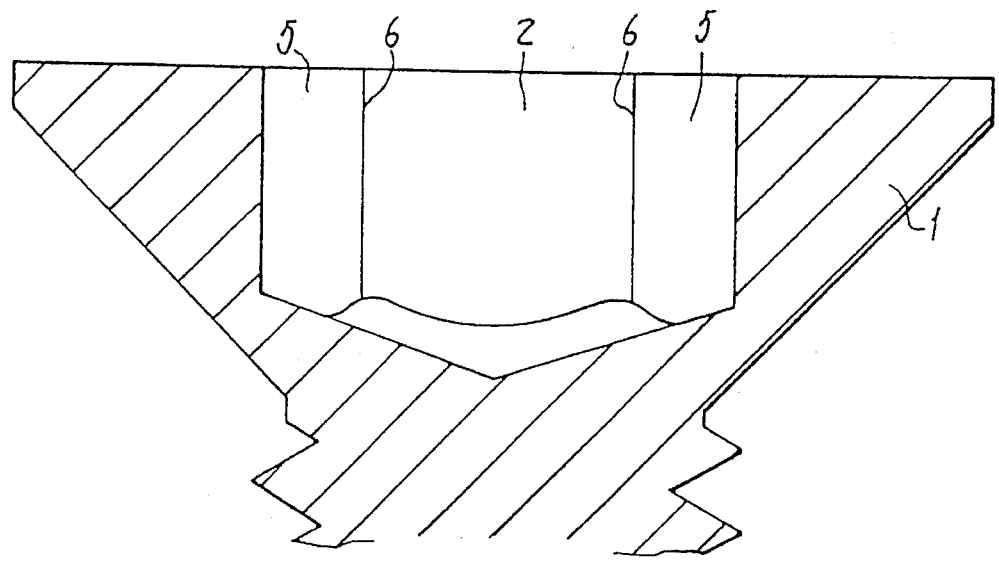
FIG. 7 is a vertical cross section in part of the prior art screw of FIG. 6.

A ratio S/T of the diameter "S" of inscribed circle to the diameter "T" of circumcircle 20 for the recess 12 is one of the important parameters. The diameter ratio S/T may be designed to be the same as that S'/T' for the diameter S' of an inscribed circle 21' and the diameter T' of a circumcircle 20' of the recess 2 in the prior art Torx screw shown in FIG. 6. In such a case, a driver bit 30 for Torx screws can also fit in the recess 12 to drive the screw 10, as shown in FIG. 5. Usually, the diameter ratio S'/T' falls within a range from 0.70 to 0.75 for the Torx screws.

As will be best seen in FIG. 1, the side walls 16a and 16a of the adjacent driven vanes 16 in the recess 12 lie in parallel with each other. A distance "E" between the walls 16a can be measured easily with any conventional instrument, for better control of the precision of recesses 12. The same applies also to the driver bits.

In summary, the recessed screw disclosed herein is satisfactory in its biting action for the inserted driver bit, which can now be driven at higher speeds, without any fear of slipping off the screw and without the problem of "ride-out". Therefore, the screw can be fastened more efficiently with a higher torque. As for the driver bit, the cross-sectional area of its driving vanes can be made so much larger than that of the driven vanes of the screw that the the strength and durability of the bit is remarkably improved.

The structures of recessed screw and driver bit which the present invention provides are advantageous in particular for the self-drilling or self-tapping screws rotated at extremely high speeds to transmit a stronger torque.

What is claimed is:

1. A driver bit adapted to engage in a recess of a recessed screw, the recess being defined as a coaxial superimposition of two equilaterally-triangular and cylindrical recesses each having arcuate vertices and arranged with a phase shift of 60° about a center axis of the recessed screw to provide six engagable grooves and six driven vanes, the driver bit comprising:

a shank member having a driving portion extending therefrom, the driving portion including six driving vanes and six valleys, wherein each driving vane is shaped in conformity with a groove in the screw recess, with each valley being interposed between adjacent driving vanes and shaped in conformity with the driven vanes in the screw recess, and wherein over at least the distal half of the driving portion, the cross-sectional area of each driving vane is larger than the cross-sectional area of the adjacent valleys.

2. A driver bit according to claim 1, wherein a bottom of each of said valleys includes a conically curved surface adapted to closely fit on a conically curved sticking wall provided in the screw recess.

3. A driver bit according to claim 1, wherein side walls of each driving vane are adapted to contact a corresponding side wall of each driven vane of the recessed screw, and wherein the side walls of each driving vane of said driver bit are disposed in parallel with the center axis of the driver bit shank, whereby the driver bit does not produce an axial component of force but imparts only rotational movement to the recessed screw.

\* \* \* \* \*